C. J. CONSER.
KITCHEN CABINET.
APPLICATION FILED FEB. 17, 1912.

1,055,519.  Patented Mar. 11, 1913.

Witnesses
N Brandt
A. A. Olson

Inventor
Charles J. Conser
By Joshua R. H. Potts
his Attorney.

UNITED STATES PATENT OFFICE.

CHARLES J. CONSER, OF CHICAGO, ILLINOIS.

KITCHEN-CABINET.

1,055,519. Specification of Letters Patent. Patented Mar. 11, 1913.

Application filed February 17, 1912. Serial No. 678,334.

*To all whom it may concern:*

Be it known that I, CHARLES J. CONSER, a citizen of the United States, and a resident of the city of Chicago, county of Cook, and State of Illinois, have invented certain new and useful Improvements in Kitchen-Cabinets, of which the following is a specification.

My invention relates to kitchen cabinets and more specifically to receptacles or bins pivotally mounted in the upper ends of kitchen cabinets for the reception of flour and the like.

The object of my invention is the production of a kitchen cabinet in which will be provided a pivotally mounted receptacle which will be of improved construction and efficient in operation.

Other objects will appear hereinafter.

The invention consists in the combinations and arrangements of parts hereinafter described and claimed.

Figure 1:
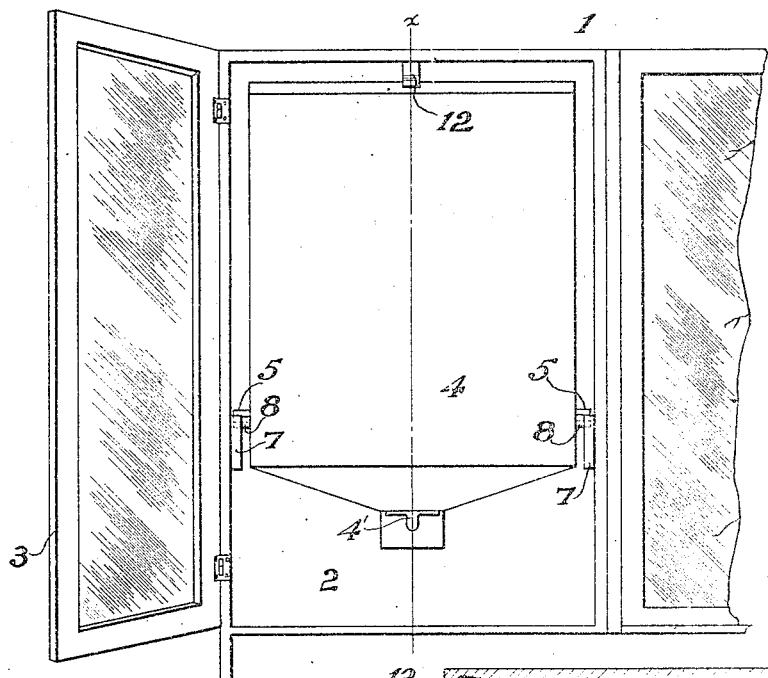
Figure 2:
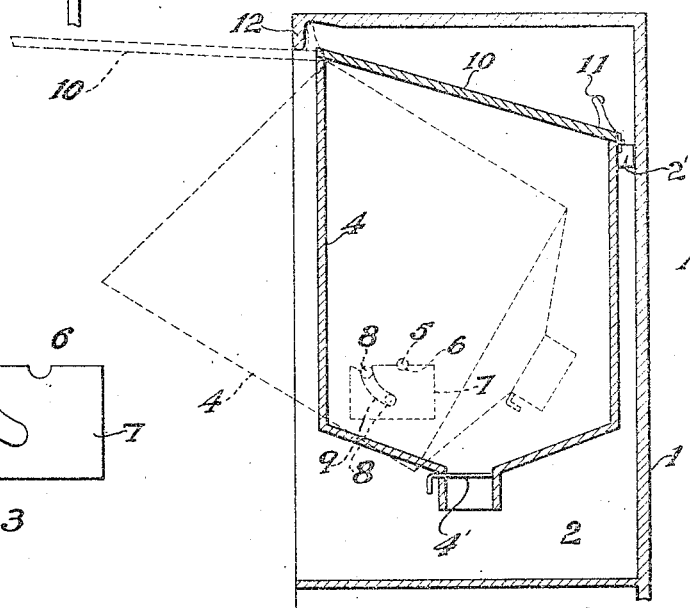
Figure 3:
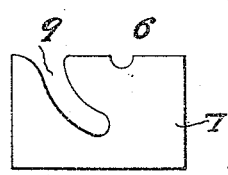

The invention will be best understood by reference to the accompanying drawing forming a part of this specification, and in which, Figure 1 is a front elevation of the upper end portion of a kitchen cabinet embodying my invention, Fig. 2 is a vertical transverse section taken on substantially line x—x of Fig. 1, and Fig. 3 is a side elevation of one of the blocks arranged within the receptacle compartment for pivotally supporting the receptacle.

The preferred form of construction as illustrated in the drawing comprises a cabinet 1 which may be of any ordinary or preferred design and construction. In the upper end of the cabinet 1 is provided a rectangular compartment 2, said compartment being accessible through a hinged door 3, which is provided at the front side thereof.

Arranged within the compartment 2 is a receptacle or bin 4 which is designed especially for the reception of flour, the lower end of said receptacle being formed into a hopper, the discharge opening being governed by a sliding closure 4'. The receptacle 4 is substantially rectangular in form, the same being of a width and depth slightly less than the corresponding dimensions of the compartment 2 so as to adapt said receptacle to be received within said compartment as shown. Said receptacle is pivotally and removably supported in the compartment 2 through the medium of trunnions 5 which project laterally from the sides of said receptacle, the outer ends of said trunnions engaging substantially semicircular recesses or notches 6 provided in the upper edges of blocks 7 secured upon the opposite sides of the compartment 2. The trunnions 5 are positioned adjacent the lower outer corners of the sides of the receptacle 4 so that, when said receptacle is in vertical or upright position, the weight of said receptacle will serve to maintain the same in this position, that is with the upper end thereof resting against a transverse spacing strip 2' provided upon the rear wall of compartment 2. Further, the construction is such as to permit of the upper end of the receptacle being swung outwardly in order to gain access to the upper open end thereof for supplying flour or other substance thereto. Said receptacle is limited in its outward swinging movement of the upper end thereof by means of laterally projecting studs 8 provided upon the sides of said receptacle adjacent the trunnions 5, said studs engaging arcuate slots 9 formed in the blocks 7, the engagement of said studs with the rearward or inner extremities of said slots serving to limit the outward swing of the receptacle as will be readily understood. The slots 9 open upwardly at the forward ends of the blocks 7 so that removal of the receptacle will be permitted upon outward and upward movement or lifting thereof, the outward movement of the receptacle being required in order that the forward edge of the upper extremity of the receptacle will clear the forward extremity of the upper wall of the compartment 2 in this removal as will be readily understood. Thus, the receptacle is supported for free outward swinging in order to gain access to the interior thereof for replenishing the supply of flour or other substance therein, and for removal when desired in order to thoroughly clean the same.

A cover 10 at the upper end of the receptacle 4 is hingedly secured at its rearward edge to the adjacent edge of the receptacle, the forward end of said cover being free to swing upwardly. Provided at the rearward edge of said cover is an upwardly projecting lug 11 adapted, when said receptacle is swung forwardly, to engage a depending stop 12 provided at the forward edge of the top wall of the compartment 2 in order to effect the swinging of said cover to open position automatically, as clearly shown in Fig. 2.

The construction set forth is durable and economical, and because of the ready removable mounting of the receptacle is rendered highly sanitary. The receptacle may be readily manipulated and is efficient in use.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a kitchen cabinet having a compartment with sides, back and top; of a receptacle movably mounted in said compartment; blocks arranged upon the opposite sides of said compartment; trunnions projecting laterally from the sides of said receptacle pivotally engaging recesses provided in said blocks; and studs laterally projecting from the sides of said receptacle engaging arcuate recesses in said blocks for limiting the outward swinging of the upper end of said receptacle, substantially as described.

2. The combination with a kitchen cabinet having a compartment with sides, back and top; of a receptacle movably mounted in said compartment; blocks arranged upon the opposite sides of said compartment; trunnions projecting laterally from the sides of said receptacle and pivotally engaging notches provided in the upper edges of said blocks; and studs laterally projecting from the sides of said receptacles slidably engaging arcuate forwardly opening recesses in said blocks for limiting the outward swinging of the upper end of said receptacle, the center of curvature of said arcuate recesses being coincident with the pivotal points of said receptacle, substantially as described.

3. The combination with a kitchen cabinet having a compartment with sides, back and top; of a receptacle movably mounted in said compartment; blocks arranged upon opposite sides of said compartment at the lower ends thereof and adjacent the forward edges of said sides; trunnions projecting laterally from the sides of said receptacle adjacent the lower ends thereof and adjacent the forward edge of said receptacle, said trunnions pivotally engaging notches provided in the upper edges of said blocks; and studs laterally projecting from the sides of said receptacle slidably engaging arcuate forwardly opening recesses in said blocks for limiting the outward swinging of the upper end of said receptacle, the center of curvature of said arcuate recesses being coextensive with the pivotal points of said receptacle, substantially as described.

4. In a cabinet, the combination with a compartment; of alined blocks mounted upon the walls of said compartment having alined recesses formed in the upper edges thereof and arcual slots formed therein extending from the forward sides thereof; a hopper bottomed receptacle; trunnions mounted upon the sides of said receptacle that can be removably mounted in the recesses aforesaid; and pins arranged upon the sides of said receptacle adapted to coöperate with the arcual slots aforesaid for limiting the outward tilting movement of said receptacle.

In testimony whereof I have signed my name to this specification in the presence of two subscribing witnesses.

CHARLES J. CONSER.

Witnesses:
  HELEN F. LILLIS,
  JOSHUA R. H. POTTS.